United States Patent [19]
Sargunar

[11] 3,913,134

[45] Oct. 14, 1975

[54] MOTOR DRIVE INCLUDING STARTING AND RUNNING SPEED CONTROL PARTICULARLY FOR MAGNETIC TAPE TRANSPORT SYSTEMS

[75] Inventor: John E. Sargunar, Fife, England

[73] Assignee: Burroughs Corporation, Detroit, Mich.

[22] Filed: Mar. 29, 1974

[21] Appl. No.: 456,151

[30] Foreign Application Priority Data

May 2, 1973 United Kingdom............... 20837/73

[52] U.S. Cl..................................... 360/73; 318/317

[51] Int. Cl.[2]..................... G11B 15/48; G11B 15/52

[58] Field of Search ................... 360/73, 72, 26, 36; 318/314, 317, 318, 306; 242/186; 226/29

[56] References Cited

UNITED STATES PATENTS

| | | | |
|---|---|---|---|
| 2,727,097 | 12/1955 | Frayne | 360/73 |
| 2,786,978 | 3/1957 | Warner | 360/73 |
| 2,854,526 | 9/1958 | Morgan | 360/73 |
| 2,963,555 | 12/1960 | Brubaker | 360/73 |
| 2,977,422 | 3/1961 | Pear, Jr. | 360/73 |
| 3,596,005 | 6/1971 | Hamilton | 360/73 |

*Primary Examiner*—Alfred H. Eddleman
*Attorney, Agent, or Firm*—Benjamin J. Barish; William B. Penn; Edwin W. Uren

[57] ABSTRACT

A motor drive control system for controlling a magnetic recording medium with a speed error signal in response to the difference between a measured speed with a commended velocity.

10 Claims, 4 Drawing Figures

Figure 1:
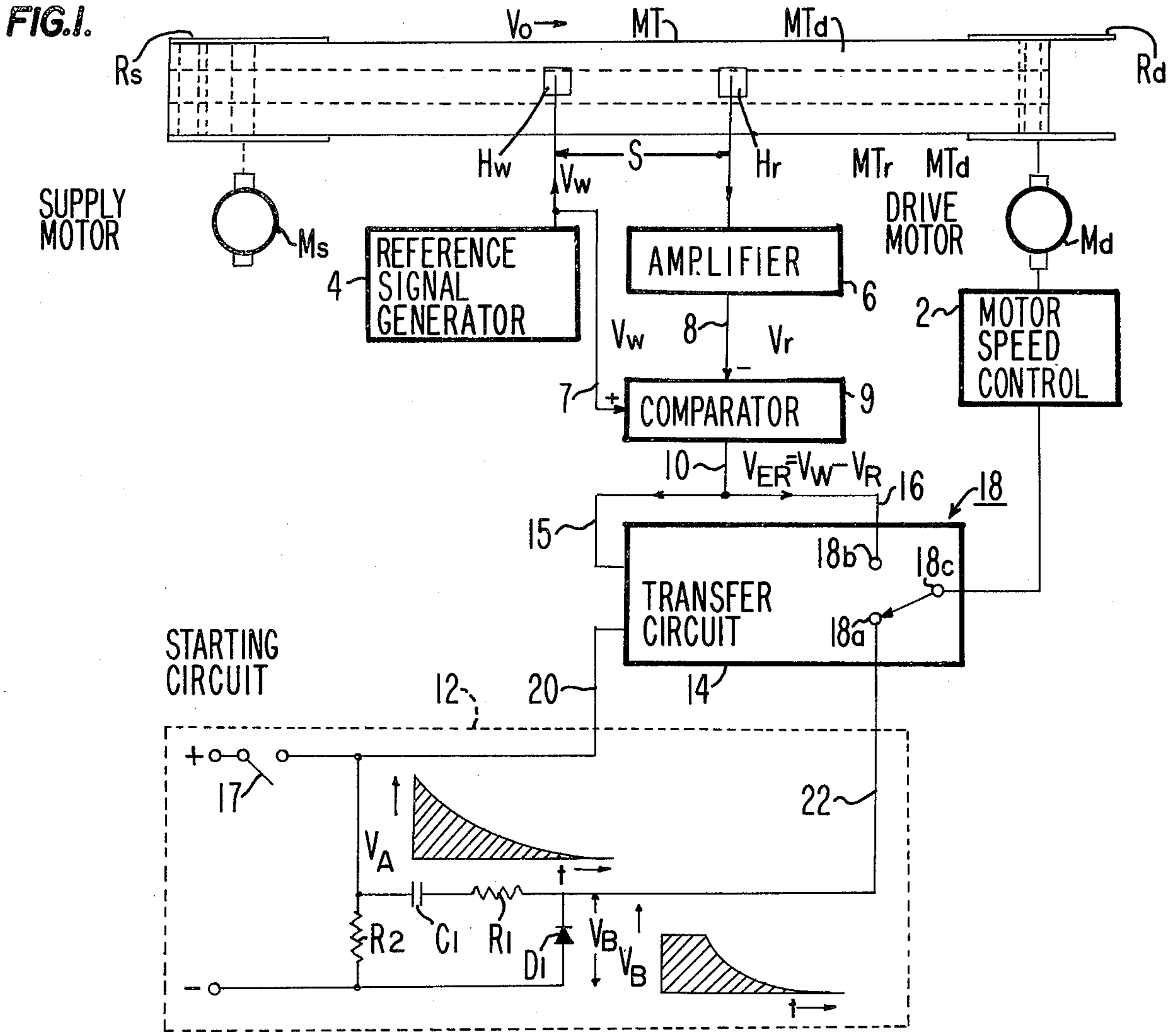

MOTOR DRIVE INCLUDING STARTING AND RUNNING SPEED CONTROL PARTICULARLY FOR MAGNETIC TAPE TRANSPORT SYSTEMS

The present invention relates to motor drive systems. It is particularly useful in magnetic tape transport systems and is therefore described below with respect to that application.

Magnetic tape transport systems commonly employ pinch rollers or capstans which engage and directly drive the tape. The linear velocity of the tape is thus directly determined by the angular velocity of the pinch roller or capstan, so that if a constant tape linear velocity is desired for example, this is easily accomplished by maintaining a constant angular velocity of the pinch roller or capstan. While the control of such drives is thus relatively simple, they are subject to a number of drawbacks. For example, the direct contact of the pinch rollers and capstans with the tape tends to deform the tape and increases its wear and tear. Further, pinch rollers and capstans are susceptible to malfunction or failure, and also involve significant manufacturing and maintenance costs.

The present invention provides a tape transport system which does not require the use of pinch rollers or capstans for driving the tape, but which rather controls the rotational speed of the motor driving the take-up reel to drive the tape at the desired linear velocity.

According to one feature of the present invention, there is provided a motor drive control system for driving a magnetic recording medium at a commanded linear velocity, the recording medium including a magnetic surface for recording a reference signal on a track thereon, comprising; a magnetic writing head; means for feeding a sinusoidal reference signal thereto for recording on said track and; a magnetic reading head spaced a predetermined distance from said writing head in the direction of travel of the recording medium and reading the recorded reference signal. The system further includes means amplifying the magnetic reading head output signal to the level of the reference signal; means vectorially subtracting one of said latter two signals from the other to produce a speed error signal; motor speed control means; and means applying said speed error signal to the speed control means to cause the magnetic recording medium to be driven at the commanded linear velocity.

According to another feature of the invention, there is provided a motor drive control system for a motor driving a driven device comprising means controlling the speed of the motor drive; means measuring the speed of the driven device; means comparing the measured driven device speed with a commanded velocity and producing a speed error signal corresponding to the difference between the two speeds. The system further includes a starting circuit including a starting switch and an R-C network effective, upon closing the starting switch, to produce an exponentially decaying voltage; and transfer means effective, upon closing the starting switch, to connect said exponentially decaying voltage to the motor speed control means to first rapidly accelerate the driven device to a speed in excess of said commanded speed and then to decelerate same in accordance with the rate of decay of said voltage, said transfer means being effective to connect said error signal to the motor speed control means upon the deceleration of the motor drive to said commanded speed.

Preferably, the magnetic recording medium is a magnetic tape adaped to have a pair of spaced data tracks recorded thereon, one on each side of said reference signal track, the magnetic writing head recording the reference signal on the latter track in quadrature with respect to the data signals on the data tracks.

According to a further feature, the transfer means comprises an analogue switch and a latching circuit effective to latch the analogue switch in the first-mentioned connection condition upon closing the starting switch, and in the second-mentioned connection condition upon the deceleration of the motor drive to the commanded speed.

Further features and advantages of the invention will be apparent from the description below.

The foregoing features are particularly useful in a constant speed tape transport system free of pinch rollers and capstans, in which the drive motor driving the drive reel is electronically controlled. It will be appreciated, however, that some of the foregoing features could advantageously be used in a tape transport system include pinch rollers or capstans or in which the tape is driven at a varying linear velocity rather than at a constant linear velocity.

Figure 2:
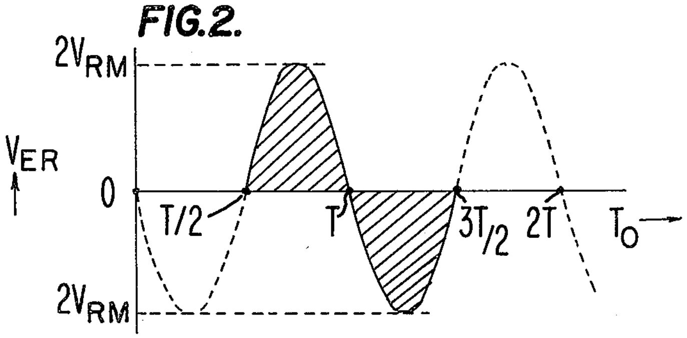
Figure 3:
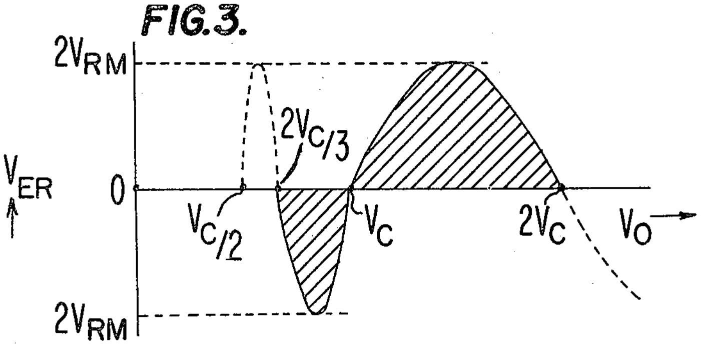
Figure 4:
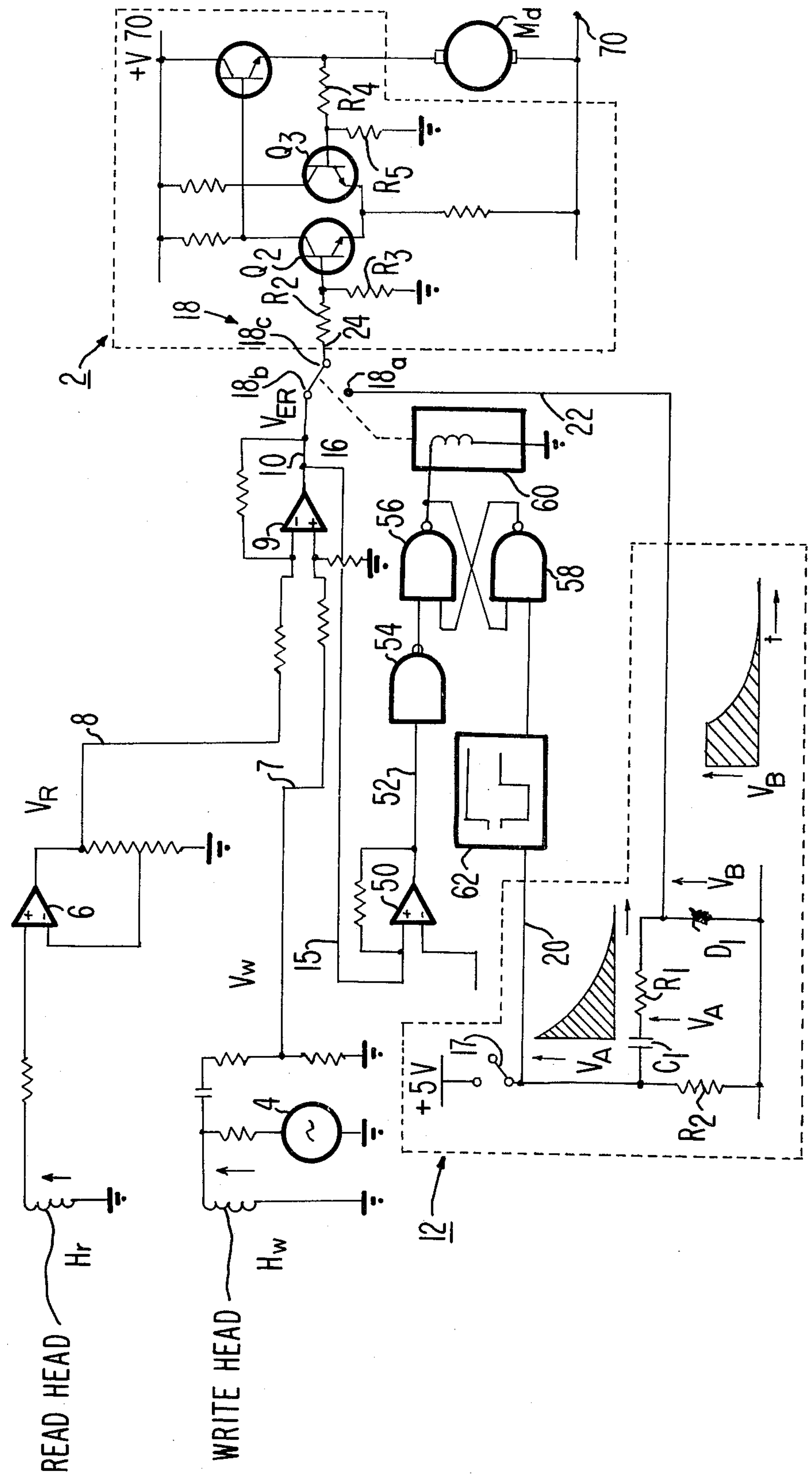

The invention is herein described, by way of example only, with reference to the accompanying drawings, wherein:

FIG. 1 is a functional block diagram illustrating one form of motor drive control system constructed in accordance with the invention;

FIGS. 2 and 3 graphically illustrate how the feedback speed error signal varies with respect to certain conditions in the system of FIG. 1; and FIG. 4 is a circuit diagram of a motor drive control system constructed in accordance with the functional block diagram of FIG. 1.

With respect to FIG. 1, there is illustrated a reel-to-reel magnetic tape transport system including a drive reel Rd driven by a drive motor Md, and a supply reel Rs driven by a supply motor Ms. The magnetic tape MT is driven at linear velocity $v_o$ in the direction of the arrow by drive motor Md, the starting, stopping and running speed of which motor are controlled by a motor speed control system generally designated 2. In the preferred embodiment of the invention described below, drive motor Md is controlled to maintain a constant linear velocity $v_o$ of the tape MT as it is driven from supply reel Rs onto drive reel Rd. If a two-direction control is desired, a similar control system could be provided for supply motor Ms.

The magnetic tape MT is adapted to have a reference signal recorded thereon along a track MTr between two spaced data tracks MTd. A magnetic writing head Hw records a sinusoidal reference signal on the reference track MTr. The reference signal may be a standard sinusoidal wave form, for example a 50 Hz voltage supplied from the standard voltage mains, schematically shown in FIG. 1 as reference signal generator 4. A magnetic reading head Hr, spaced from the writing head Hw a predetermined distance *s*, reproduces the reference signal and amplifies it in amplifier 6 to the level of the recorded reference signal.

The original reference signal $V_W$ supplied to Write-head Hw is also supplied via line 7 to a comparator 9. The amplified reproduced reference signal $V_R$ is also supplied to the comparator via line 8. Comparator 9 is a subtractor which vectorially subtracts signal $V_R$ from signal $V_W$ to produce a speed error signal $V_{ER}$ on its output line 10.

The speed error signal $V_{ER}$ is a measure of the deviation of the actual tape linear speed $v_o$ from the predetermined constant speed, and varies with the phase displacement ($\phi_o$) between the equal amplitude recorded and reproduced sinusoidal reference signals, being 0 when $\phi_o$ is equal to 0, $2\pi$, $4\pi$, — $2n\pi$, as shown by the following:

Assuming the recording frequency (e.g. 50Hz) is $w_o$, then $$V_W = V_{WM} \text{ Sin } (w_o t), \qquad (1)$$

and $$V_R = V_{RM} \text{ Sin } (w_o t + \phi_o) \qquad (2)$$

where:

$V_W$ is the recorded reference signal on line 7

$V_{WM}$ is the peak value of $V_W$ $V_R$ is the amplified reproduced signal on line 8

$V_{RM}$ is the peak value of $V_R$ $\phi_o$ is the lag introduced because of the Read-Write separation distance $s$.

Since Sin (A + B) = Sin A · Cos B + Cos A · Sin B, we see that:

$$V_R = V_{RM} \text{ Sin } w_o t \cdot \text{Cos } \phi_o + \text{Cos } w_o t \cdot \text{Sin } \phi_o \qquad (3)$$

$$V_R = V_{RM} (\text{Sin } w_o t)\cdot(\text{Cos } \phi_o) + V_{RM} (\text{Cos } w_o t)\cdot \qquad (4)$$

Since $V_{ER} = V_W - V_R$ $$V_{ER} = V_{WM} \text{ Sin } (w_o t) - V_{RM} (\text{Sin } w_o t + \phi_o) \qquad (5)$$

Substituting $V_{RM} = V_{WM}$ (as a result of amplifier 6);

$$V_{ER} = V_{RM} \text{ Sin } w_o t - V_{RM} \text{ Sin } w_o t \cdot \text{Cos } \phi_o - V_{RM} \text{ Cos } w_o t \cdot \text{Sin } \phi_o \qquad (6)$$

when $\phi_o = 0, 2\pi, 4\pi, — 2n\pi$

Cos $\phi_o = 1$; and Sin $\phi_o = 0$

And therefore, $V_{ER} = 0$.

Thus, when $\phi_o = 0, 2\pi$, or multiples thereof, the error voltage $V_{ER}$, is zero, and the drive motor Md drives the tape at the predetermined commanded linear tape velocity $v_c$. That is to say, when $V_{ER} = 0$:

$$v_o = v_c \qquad (7)$$

where:

$v_o$ = actual linear tape velocity $v_c$ = commanded linear tape velocity

The commanded linear tape velocity is determined by the following relationship:

$$v_c = s/T = s w_o \qquad (8)$$

where:

$s$ = distance between magnetic heads Hw and Hr

T = time period of the reference signal (= $1/w_o$)

$w_o$ = frequency of the reference signal.

Thus, the desired or commanded linear velocity $v_c$ is constant when both $s$ and $w_o$ are constant, as in the described system. However, in some applications it may be desired to have a varying command linear velocity, which can be attained by providing a reference signal (e.g. from signal generator 4) of the appropriate varying frequency.

The system of FIG. 1 includes a starting circuit, generally designated 12, which applies an excessive but exponentially decaying voltage to the motor control 2 to first rapidly accelerate drive motor Md to a tape linear speed in excess of the desired constant linear speed $v_o$, and then to decelerate it in accordance with the rate of decay of the voltage. Further provided is a transfer circuit 14 which receives the error signal $V_{ER}$ via line 15, and is also effective, via line 16, to connect it to the speed control system 2 upon the deceleration of the motor drive to the desired constant tape linear speed.

Starting circuit 12 includes a starting-switch 17 which when closed, provides the start command for the motor drive. The starting voltage (e.g., 5 volts) is applied across a capacitor C1, a resistor R1, and a Zener diode D1 all connected in series across a second resistor R2. Resistor R1 and capacitor C1 form an R-C network to produce an exponentially decaying voltage $V_A$, which voltage is clipped by Zener diode D1 to provide a clipped exponentially decaying voltage $V_B$. The latter voltage is applied to a fixed contact 18a of a transfer switch 18. Switch 18 includes a second fixed contact 18b receiving the speed error signal $V_{ER}$, and a movable contact 18c connected to the motor speed control circuit 2.

The system of FIG. 1 operates as follows: When a start command is given to drive motor Md by closing switch 17, the start command (voltage $V_A$) is applied via line 20 to transfer circuit 14 to cause it to connect its movable contact 18c to fixed contact **18*a* (as shown in FIG. 1), whereby the exponentially decaying voltage $V_B$ is applied to motor control circuit 2 via line 22. The motor thus accelerates very quickly to a speed in excess of the speed necessary to move tape MT at the desired constant velocity $v_c$. This excess speed is sensed by comparator 9 from the signals $V_W$ and $V_R$ from the Write-head Hw and Read-head Hr, respectively, producing a speed and thereby the tape linear speed, error signal $V_{ER}$. As the motor speed decreases with the decay of the voltage $V_B$ supplied from the starting circuit, error signal $V_{ER}$ decreases, and when it crosses the zero point, this is detected by transfer circuit 14. The latter circuit actuates its switch contact 18*c* to transfer the input line 24 of the motor control circuit 2 from starting circuit 12** to the feedback error signal $V_{ER}$. Thereafter, motor Md is controlled by the speed error signal $V_{ER}$ to maintain the predetermined constant tape linear velocity $v_c$.

To determine the instant the transfer circuit 14 is to be actuated to transfer control of the motor speed from the starting circuit 12 to the feedback speed error signal $V_{ER}$, it is desirable to plot the error signal as a function of the linear tape velocity ($v_o$) for a fixed distance between heads ($s$) and time period (T) of the reference signal ($W_o$ = 50Hz).

From relationship (6) above, and after substituting:

$$\phi_o\ 32\ 2\pi\ T_o/T \quad (9)$$

wherein $T_o$ is the time period for the tape to move distance $s$, it will be seen that:

$$V_{ER} = V_{RM} \text{ Sin } w_o t - V_{RM} \text{ Sin } w_o t \text{ Cos } (2\pi\ T_o/T) - \text{Cos } w_o t \text{ Sin } (2\pi\ T_o/T)$$

$$V_{ER} = V_{RM} \text{ Sin } w_o t\ [1 - \text{Cos } (2\pi\ T_o/T) - \text{Sin } (2\pi\ T_o/T)] \quad (11)$$

FIG. 2 graphically illustrates this relationship, wherein it will be seen that $V_{ER}$ is zero when $T_o = T$, is positive when $T_o = T/2$ to T, and is negative when $T_o = T$ to $3T/2$, substituting:

$$T_o = s/v_o, \quad (12)$$

we arrive at the relationship:

$$V_{ER} = V_{RM} \text{ Sin } w_o t\ [1 - \text{Cos } (2\pi\ s/T\ v_o) - \text{Sin } (2\pi\ s/T\ v_o)] \quad (13)$$

FIG. 3 graphically illustrates this relationship. Control is effective within the shaded portion 2 $v_c$ to 2 $v_c/3$. It will be seen that when the tape velocity ($v_o$) is greater than the commanded velocity ($v_c$), $V_{ER}$ is positive; and when less than $v_c$, it is negative within this range.

Whenever the tape is stopped and a new start command is given, by closing switch 17 of the starting circuit 12, the start command is also applied via line 20 to transfer circuit 14, causing that circuit to actuate switch contact 18*c* to engage contact 18*a* and thus to transfer control of the motor back to the starting circuit.

FIG. 4 illustrates more details of a specific circuit that may be used in the system of FIG. 1, corresponding parts being correspondingly numbered in the two figures.

The sinusoidal reference signal is magnetically recorded on the reference track of the tape by Write-head Hw supplied from reference signal generator 4 (e.g. 50 Hz voltage supply mains), and this signal ($V_W$) is also fed via line 7 to one input of comparator 9. The recorded reference signal is reproduced by the spaced Read-head Hr, amplified by amplifier 6 to equal the amplitude level of the recorded signal $V_R$, and fed as signal $V_R$ via line 8 to the other input of comparator 9. In comparator 8, the amplified reproduced signal ($V_R$) is vectorially subtracted from the recorded reference signal ($V_W$), the signal on output line 10 being the speed error signal ($V_{ER}$). As will be recalled from the above description, if the actual linear tape speed is above the predetermined constant speed, error signal $V_{ER}$ on line 10 will be positive, and if below the predetermined speed, the error signal will be negative. Error signal $V_{ER}$ is fed via line 16 to contact 18*b* of the transfer circuit.

The error signal $V_{ER}$ is also fed via line 15 to one terminal of a comparator 50 in the transfer circuit (14, in FIG. 1). The other terminal of the comparator is connected to ground so that the comparator produces a positive output on line 52 whenever the error signal $V_{ER}$ crosses from positive to negative. This error signal is fed via NAND-gate 54 to a latching circuit including two additional NAND-gates 56, 58, the output of which circuit is connected to the actuating coil 60 of an analogue switch which includes the switch contact 18*c* of the previously described transfer circuit.

The starting circuit of FIG. 4 is basically the same as circuit 12 in FIG. 1, and therefore, the same reference numerals are used. Thus, the starting circuit includes a switch 17 which, when closed, produces the start command to drive motor Md. The power supply of the starting circuit is a DC source, e.g. plus 5 volts. When switch 17 is closed, this DC voltage is applied via line 20 to a monostable single-swing oscillator 62 which produces a pulse to NAND-gate 58 of the latching circuit. This pulse causes the latching circuit to actuate the analogue switch coil 60 to move its switch contact 18*c* out of engagement with contact 18*b* from the previous operation and into engagement with contact 18*a*. Thus, at the start, the input line 24 of the motor control circuit 2 is not connected to receive the speed error signal $V_{ER}$ from line 16, but rather is connected to receive the starting voltage from the starting circuit 12 via line 22.

As also described with respect to FIG. 1, this starting voltage is at first a high voltage to rapidly accelerate motor Md to a speed ($v_o$) in excess to the desired constant tape linear speed ($v_c$), this voltage exponentially decaying, by virtue of the R1-C1 network, so that the motor decelerates in accordance with its rate of decay. During its initial starting condition, the error signal $V_{ER}$ is positive, but decreases as the motor speed decreases towards the predetermined constant speed $v_c$ (see FIG. 3). When the speed error signal $V_{ER}$ crosses the line, this is detected by comparator 50, which produces a pulse on output line 52, via NAND-gate 54, to NAND-gate 56 of the latching circuit, causing the latter to actuate analogue switch coil 60 to move its contact 18*c* from contact 18*a* to contact 18*b*. Thus, the control of the motor is now transferred to receive the feedback error signal $V_{ER}$ of the speed measuring circuit, and is thereafter effective to maintain a constant linear tape speed.

When the motor is stopped and a new start command is given by closing switch 17, monostable oscillator 62 feeds another pulse to the latching circuit to latch same into the condition wherein contact 18*c* engages contact 18*a*, whereby the motor is again connected to the starting circuit.

Thus, the circuit illustrated not only provides a fast start-acceleration characteristic to the drive motor, but also automatically transfers the motor control at the precise instant after start so that the motor control is thereafter responsive to the feedback error signal to maintain the commanded constant tape linear velocity.

FIG. 4 also illustrates one form of motor speed control system 2 that may be used. It comprises a transistor Q1 having its collector and emitter connected in series with the drive motor Md supplied from DC supply conductors 70. The base of transistor Q1 is controlled by the voltage error signal $V_{ER}$ from input line 24 after the signal is amplified by a differential emitter-coupled amplifier including transistors Q2, Q3. The base of transistor Q2 constitutes the input side of the differential amplifier and is connected to receive the motor feedback error signal $V_{ER}$ (when switch 18 is in the running mode) via voltage divider resistors R2, R3. Transistor Q1 is an emitter follower, its emitter following its base, the latter being tied to the collector of transistor Q2. For stabilization purposes, the base of transistor Q3 is connected via voltage divider resistors R4, R5 to the emitter of transistor Q1 to receive a portion of the output voltage of transistor Q1.

Thus, when the actual tape linear velocity $v_o$ exceeds the commanded velocity $v_c$, the feedback error signal $V_{ER}$ is positive, which makes transistor Q2 more conductive. This decreases the voltage on its collector, causing transistor Q1 to be less conductive, whereby motor Md draws less current and thereby decreases its speed. When $V_{ER}$ is negative, motor Md draws more current and thereby increases its speed.

Many other variations and applications of the illustrated embodiment will be apparent.

What is claimed is:

1. A magnetic tape transport system for driving a magnetic tape at a commanded linear velocity, comprising : a drive reel; a motor for driving the drive reel; a supply reel for the magnetic tape; means for recording data signals on at least one data track on the magnetic tape; a magnetic writing head; means for inputting a sinusoidal reference signal to said writing head for recording same on a reference signal track on the magnetic tape; a magnetic reading head spaced a predetermined distance from said writing head in the direction of travel of the magnetic tape and reading the recorded reference signal; means amplifying the magnetic reading head output signal to the level of the inputted reference signal; means vectorially subtracting one of the said latter two signals from the other to produce a speed error signal; speed control means controlling the speed of said motor driving the drive reel; and means applying said speed error signaal to the speed control means to cause the magnetic tape to be driven at the commanded linear velocity.

2. A system according to claim 1, further including: a starting circuit having a starting switch and an R-C network effective, upon closing the starting switch, to produce an exponentially decaying voltage; and transfer means effective, upon closing the starting switch, to connect said exponentially decaying voltage to the motor speed control means to first rapidly accelerate the magnetic tape to a speed in excess of said commanded linear velocity and then to decelerate same in accordance with the rate of decay of said voltage, said transfer means being effective to connect said error signal to the motor speed control means upon the deceleration of the magnetic tape to said commanded linear velocity.

3. A motor drive control system for a motor driving a driven device, comprising:

means controlling the speed of the motor drive;

means measuring the speed of the driven device;

means comparing the measured driven device speed with a commanded speed and producing a speed error signal corresponding to the difference between the two speeds; a starting circuit including a starting switch and an R-C network effective, upon closing the starting switch, to produce an exponentially decaying voltage; and transfer means effective, upon closing the starting switch, to connect said exponentially decaying voltage to the motor speed control means to first rapidly accelerate the driven device to a speed in excess of said commanded speed and then to decelerate same in accordance with the rate of decay of said voltage, said transfer means being effective to connect said error signal to the motor speed control means upon the deceleration of the driven device to the said commanded speed.

4. A system according to claim 3, wherein the motor drives a magnetic recording medium at a commanded linear velocity, the recording medium containing a surface for recording a sinusoidal reference signal on a track thereof; said speed measuring means comprising a magnetic writing head, means for inputting the sinusoidal reference signal thereto for recording on said track, and a magnetic recording head spaced a predetermined distance from the writing head in the direction of travel of the recording medium and reading the recorded reference signal; said comparing means comprising means amplifying the magnetic reading head output signal to the level of the inputted reference signal; amd means vectorially subtracting one of said latter two signals from the other to produce said error signal.

5. A system according to claim 4, wherein said magnetic recording medium is a magnetic tape having a pair of spaced data tracks, one on each side of said reference signal track, the magnetic writing head recording the reference signal on the latter track in quadrature with respect to the data signals on the data tracks.

6. A system according to claim 3, wherein said starting circuit further includes a Zener diode connected in series with said R-C network, said transfer means connecting the juncture of the Zener diode and the R-C network to the motor speed control means upon closing the starting switch.

7. A system according to claim 3, wherein said transfer means comprises an analogue switch and a latching circuit effective to latch the analogue switch in the first-mentioned connection condition upon closing the starting switch and in the second-mentioned connection condition upon the deceleration of the motor drive to the commanded speed.

8. A system according to claim 7, wherein said starting circuit further includes a monostable single-swing oscillator effective to produce a pulse to the latching circuit upon actuation of the starting switch.

9. A system according to claim 3, wherein said motor speed control means comprise a power supply for the motor, a transistor having its collector and emitter connected in series with the motor, and a differential emitter-coupled transistor amplifier having one input side connected to receive said motor speed error signal and the other input side connected to receive a voltage varying with the voltage output of said first transistor, the output of said differential amplifier being connected to the base of said first transistor.

10. A system according to claim 3, wherein said commanded velocity is a constant linear velocity.

* * * * *